US008957563B2

(12) United States Patent
Rahman et al.

(10) Patent No.: US 8,957,563 B2
(45) Date of Patent: Feb. 17, 2015

(54) ROTOR GEOMETRY FOR REDUCTION OF TORQUE RIPPLE IN A WOUND FIELD MACHINE

(75) Inventors: Khwaja M. Rahman, Troy, MI (US); Constantin C. Stancu, Torrance, CA (US); Sinisa Jurkovic, Sterling Heights, MI (US); Xinyu Zhou, Troy, MI (US); Qiang Niu, Novi, MI (US); Xu Han, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 13/314,065

(22) Filed: Dec. 7, 2011

(65) Prior Publication Data
US 2013/0147309 A1 Jun. 13, 2013

(51) Int. Cl.
*H02K 1/06* (2006.01)
(52) U.S. Cl.
USPC .............................. 310/216.092; 310/216.094
(58) Field of Classification Search
CPC ..... H02K 29/03; H02K 2201/03; H02K 1/24; H02K 1/146
USPC ...................... 310/216.092, 216.094, 216.096
See application file for complete search history.

(56) References Cited

U.S. PATENT DOCUMENTS

| 4,280,072 | A * | 7/1981 | Gotou et al. ................. 310/67 R |
| 6,784,590 | B2 * | 8/2004 | Ohnishi et al. ............. 310/254.1 |
| 7,474,029 | B2 | 1/2009 | Rahman et al. |
| 7,847,461 | B2 | 12/2010 | Rahman et al. |
| 7,969,058 | B2 | 6/2011 | Rahman et al. |
| 8,664,826 | B2 * | 3/2014 | Krotsch ................. 310/216.092 |
| 2006/0273667 | A1 * | 12/2006 | Horng et al. .................... 310/51 |
| 2009/0140592 | A1 | 6/2009 | Rahman et al. |
| 2009/0140593 | A1 | 6/2009 | Kaiser et al. |
| 2010/0213781 | A1 | 8/2010 | Rahman et al. |
| 2011/0037339 | A1 | 2/2011 | Rahman et al. |
| 2011/0304238 | A1 * | 12/2011 | Nagai et al. ............. 310/216.092 |
| 2012/0025665 | A1 * | 2/2012 | Takahashi et al. ..... 310/216.094 |

* cited by examiner

*Primary Examiner* — Hanh Nguyen
(74) *Attorney, Agent, or Firm* — Quinn Law Group, PLLC

(57) ABSTRACT

An electric machine is provided with a rotor configured to be rotatable within a stator. A first and second tooth are disposed circumferentially along an outer perimeter of the rotor and at least partially define a first slot. The first and the second tooth define a respective first and second outer edge extending between a respective tooth base and a respective tooth tip. An arc radius from the origin to the outer perimeter of the rotor varies along the first outer edge of the first tooth, thereby creating a first non-uniform gap between the rotor and the stator. The arc radius from the origin to the outer perimeter of the rotor varies along the second outer edge of the second tooth, thereby creating a second non-uniform gap between the rotor and the stator. The rotor geometry is configured to reduce torque ripple without skewing either the rotor or the stator.

14 Claims, 2 Drawing Sheets

ROTOR GEOMETRY FOR REDUCTION OF TORQUE RIPPLE IN A WOUND FIELD MACHINE

TECHNICAL FIELD

The present invention relates generally to electric machines, and more particularly, to the configuration of the rotor in a wound field machine.

BACKGROUND

An electric machine typically includes a stator having a plurality of stator windings and a rotor rotatable within the stator. In a generator mode, the rotation of the rotor induces voltage in the stator winding, which powers an external load such as charging a battery pack. Alternately, if an electric current is passed through the stator windings, the energized coils may cause the rotor to rotate and the machine will perform as a motor. Electric machines may produce undesirable torque ripple, resulting in unwanted vibration and noise. Traditionally, the rotor and/or stator of the electric machine is skewed in order to reduce torque ripple. However, employing stator or rotor skew may make manufacturing more complicated and reduce torque output.

SUMMARY

An electric machine is provided with a rotor configured to be rotatable within a stator. A first and second tooth are disposed circumferentially along an outer perimeter of the rotor and at least partially define a first slot. The first and the second tooth define a respective first and second outer edge extending between a respective tooth base and a respective tooth tip. An arc radius from the origin to the outer perimeter of the rotor varies along the first outer edge of the first tooth, thereby creating a first non-uniform gap between the rotor and the stator. The arc radius from the origin to the outer perimeter of the rotor varies along the second outer edge of the second tooth, thereby creating a second non-uniform gap between the rotor and the stator. The rotor geometry is configured to reduce torque ripple without skewing either the rotor or stator.

The rotor may include a third and a fourth tooth disposed along an outer perimeter of the rotor that at least partially define a second slot in the rotor. The third and the fourth tooth each define a respective third and fourth outer edge extending between a respective tooth base and a respective tooth tip. The arc radius from the origin to the outer perimeter of the rotor varies along the third and fourth outer edges of the second tooth, thereby creating a third and fourth non-uniform gap between the rotor and the stator, respectively.

The first, second, third and fourth outer edges may be defined by an arc of a first, second, third and fourth circle, respectively, centered on a straight line between the origin of the rotor and the first, second, third and fourth circle tooth base, respectively. The first, second, third and fourth circle define a first, second, third and fourth radius, respectively. In one example, the first radius is different from the second radius and the third radius is the same as the fourth radius. In one example, the first radius is approximately 55.0 mm, the second radius is approximately 50.8 mm and the third and the fourth radius are approximately 52.9 mm. In another example, the first, second, third and fourth radius are each different from one another.

The first slot defines a first slot central axis midway through the first slot. A first slot opening is defined by a space between the first and the second tooth tips and includes a first slot opening central axis midway between the first and the second tooth tips. In one embodiment, the first slot opening central axis is aligned with the first slot central axis. In another embodiment, the first slot opening central axis is not aligned with or offset from the first slot central axis.

A second slot opening is defined by a space between the third and fourth tooth tips and includes a second slot opening central axis midway between the third and fourth tooth tips. The first slot opening central axis may be offset from the first slot central axis in a first direction and the second slot opening central axis may be offset from the second slot central axis in a second direction. The first and second slot opening central axes may be offset from the first and second slot central axes in the same direction. The first and second slot openings may have different widths.

The rotor may include a plurality of slots such that each pair of slots defines a configuration or set of values for the first, second, third and fourth radii and first and second widths of the first and second slot openings. This configuration may be repeated for each pair of slots in the rotor.

The above features and advantages and other features and advantages of the present invention are readily apparent from the following detailed description of the best modes for carrying out the invention when taken in connection with the accompanying drawings.

DETAILED DESCRIPTION

Figure 1:
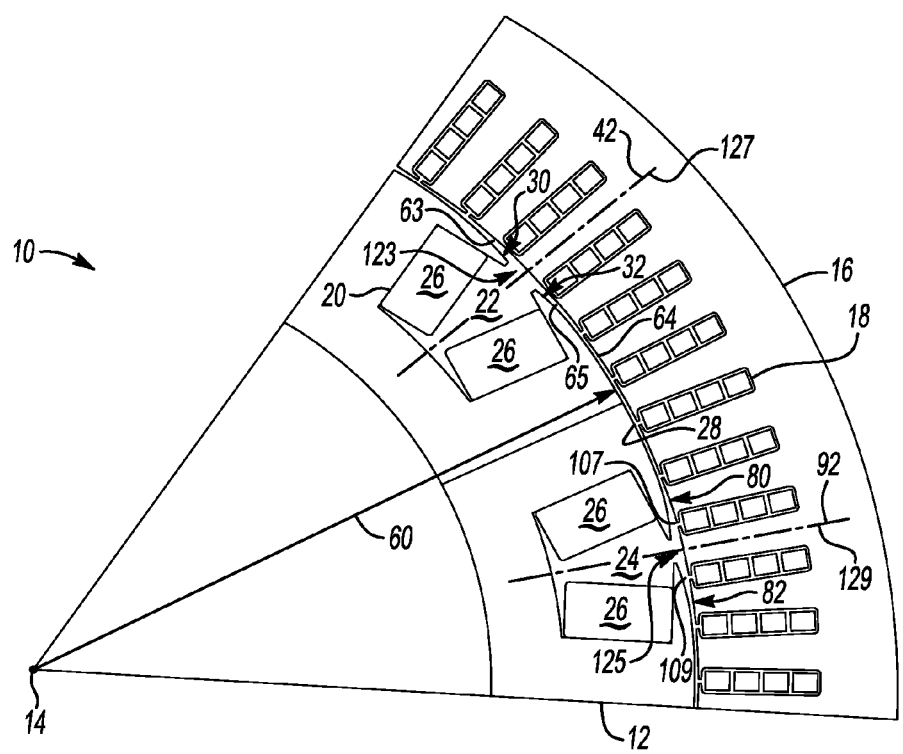
FIG. 1 is a schematic fragmentary cross-sectional view of an electric machine including a rotor and stator, in accordance with a first embodiment of the present disclosure.

Referring to the Figures, wherein like reference numbers refer to the same or similar components throughout the several views, FIG. 1 is a schematic cross-sectional view of an electric machine 10. The machine 10 includes a rotor 12 having an origin 14. The rotor 12 is rotatable within a generally annular stator 16 having a plurality of stator windings 18. The rotor 12 includes a plurality of slots 20 in the rotor 12, such as first slot 22 and second slot 24. Referring to FIG. 1, the first slot 22 is at least partially defined by a first and a second tooth 30, 32 disposed along an outer perimeter 28 of the rotor 12. Rotor field windings 26 may be positioned in each of the plurality of slots 20, thereby creating a plurality of poles in the rotor 12. The electric machine 10 may be a separately excited machine with separate sources for powering the stator windings 18 and rotor field windings 26. The rotor 12 may be formed with any number of poles or slots.

Figure 2:
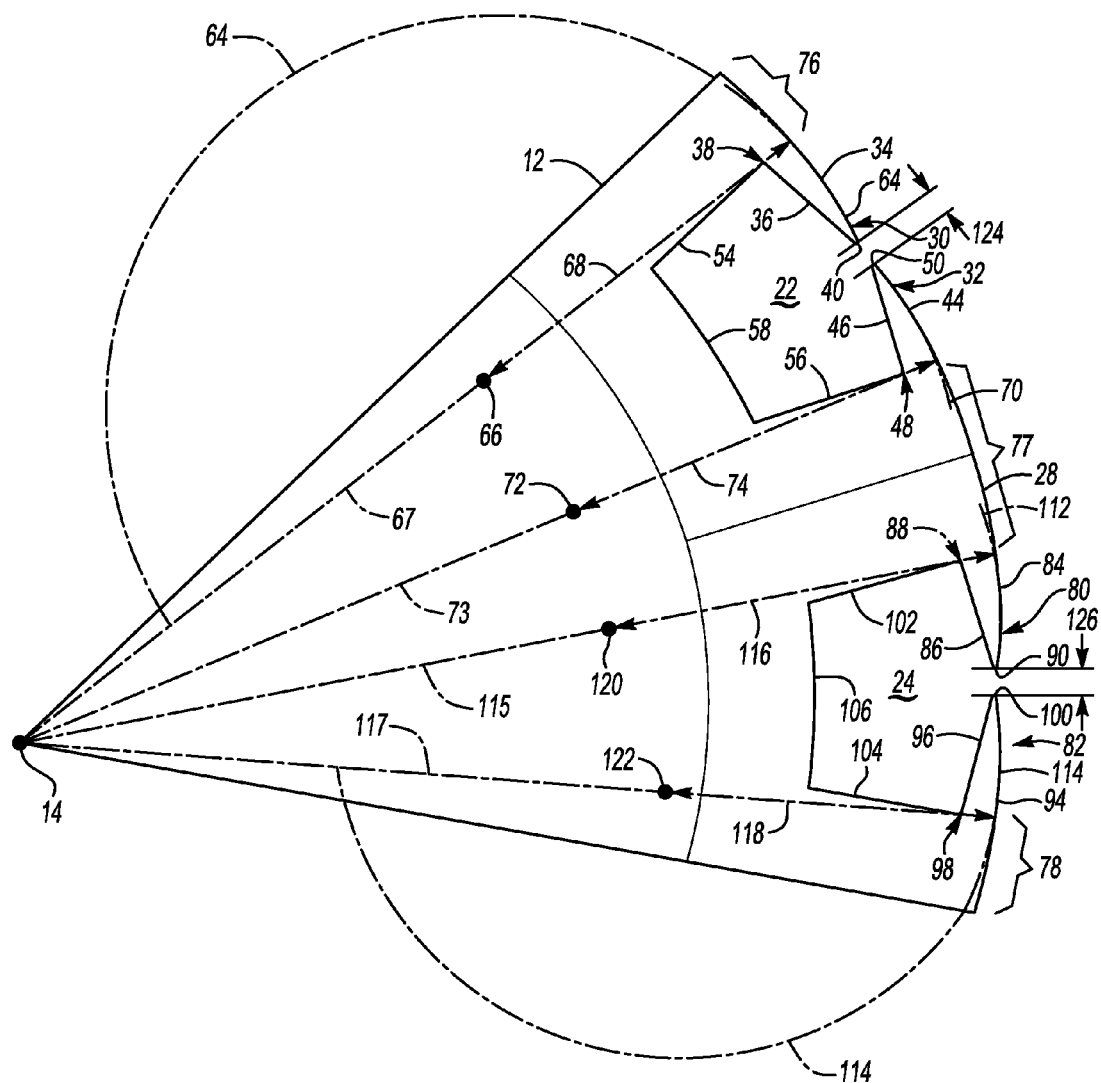
FIG. 2 is a magnified view of a portion of the rotor shown in FIG. 1.

FIG. 2 is a magnified view of a portion of the rotor 12 shown in FIG. 1. Referring to FIG. 2, the first tooth 30 defines a first outer edge 34 and a first inner edge 36, both of which extend between a first tooth base 38 and a first tooth tip 40. The first outer edge 34 is radially outwards of the first inner edge 36. The first tooth tip 40 extends circumferentially from the first outer edge 34, in a direction substantially perpendicular to a central axis 42 (shown in FIG. 1) of the first slot 22, referred to herein as the first slot central axis 42. Similarly, the second tooth 32 defines a second outer edge 44 and a second inner edge 46, extending between a second tooth base 48 and a second tooth tip 50. The second tooth tip 50 extends circumferentially from the second outer edge 44, in a direction substantially perpendicular to the first slot central axis 42.

Referring to FIG. 2, the first slot 22 is at least partially defined by sidewalls 54, 56 and a bottom wall 58. The first inner edge 36 may be approximately perpendicular with respect to the sidewall 54. The second inner edge 46 may be approximately perpendicular with respect to the sidewall 56.

Referring to FIG. 1, an arc radius 60 is defined as the distance between the origin 14 of the rotor 12 and the outer perimeter 28 of the rotor 12. The arc radius 60 varies along the first outer edge 34, that is, the various points along the first outer edge 34 are not all located at the same distance from the origin 14 of the rotor 12. Referring to FIG. 1, the first outer edge 34 may be configured to create a first non-uniform gap 63 between the outer diameter or outer perimeter 28 of the rotor 12 and the inner diameter 64 of the stator 16. Similarly, referring to FIG. 1, the arc radius 60 varies along the second outer edge 44, thereby creating a second non-uniform gap 65 between the rotor 12 and the stator 16. The shape of the first outer edge 34 of the first tooth 30 may be independent of the shape (or variation of distance from the origin) of the second outer edge 44 of the second tooth 32.

In one example, referring to FIG. 2, the first outer edge 34 may be defined by an arc of a first circle 64 (in dashed lines and partially shown as a semi-circle) having a first center 66 located on a straight line 67 between the first tooth base 38 and the origin 14 and defining a first radius 68. Referring to FIG. 2, the second outer edge 44 may be defined by an arc of a second circle 70 (in dashed lines and only partially shown) having a second center 72 located on a straight line 73 between the second tooth base 48 and the origin 14 and defining a second radius 74. The first and second outer edges 34, 44 may be shaped in any other fashion in order to produce an arc radius that varies from the respective tooth bases 38, 48 to the respective tooth tips 40, 50.

Referring to FIG. 1, the second slot 24 is at least partially defined by a third and a fourth tooth 80, 82 disposed along the outer perimeter 28 of the rotor 12. Referring to FIG. 2, the third tooth 80 defines a third outer edge 84 and a third inner edge 86, both of which extend between a third tooth base 88 and a third tooth tip 90. The fourth tooth 82 defines a fourth outer edge 94 and a fourth inner edge 96, both of which extend between a fourth tooth base 98 and a fourth tooth tip 100 as shown in FIG. 2. Referring to FIG. 2, the third and fourth tooth tips 90, 100 extend circumferentially from the third and the fourth outer edges 84, 94, respectively, in a direction substantially perpendicular to a central axis 92 (shown in FIG. 1) of the second slot 24, referred to herein as the second slot central axis 92. Referring to FIG. 2, the second slot 24 is at least partially defined by sidewalls 102, 104, a bottom wall 106. The third inner edge 86 may be approximately perpendicular with respect to the sidewall 102. The fourth inner edge 96 may be approximately perpendicular with respect to the sidewall 104.

Referring to FIG. 1, the arc radius 60 varies along the third and the fourth outer edges 84, 94, thereby creating a third and fourth non-uniform gap 107, 109 between the outer diameter or outer perimeter 28 of the rotor 12 and the inner diameter 64 of the stator 16. In one example, referring to FIG. 2, the third and the fourth outer edge 84, 94 may be defined by an arc of third and fourth circles 112, 114, respectively. Referring to FIG. 2, the third circle 112 (in dashed lines and only partially shown) may be centered at a third center 120 located on a straight line 115 between the origin 14 and the third tooth base 88 and defines a third radius 116. Referring to FIG. 2, the fourth circle 114 (in dashed lines and partially shown as a semi-circle) may be centered at a fourth center 122 located on a straight line 117 between the origin 14 and the fourth tooth base 98 and defines a fourth radius 118.

The shapes of each of the first, second, third and fourth outer edges 34, 44, 84, 94 may be independent of one another. In one example, two of the first, second, third and fourth radii 68, 74, 116 and 118 are the same and two are different. In another example, three of the first, second, third and fourth radii 68, 74, 116 and 118 are the same and one is different. In another example, each of the first, second, third and fourth radii 68, 74, 116 and 118 are different from one another.

Referring to FIG. 2, portions of the outer perimeter 28 of the rotor 12 adjacent to the teeth 30, 32, 80, 82, such as portion 76 adjacent to the first tooth 30, portion 77 adjacent to the second and third tooth 32, 80 and portion 78 adjacent to the fourth tooth 82, may have an arc radius that is uniform relative to the origin 14 of the rotor 12.

Referring to FIG. 1, a first slot opening 123 is defined by a space between the first and the second tooth tips 40, 50 (labeled in FIG. 2). A second slot opening 125 (shown in FIG. 1) is defined by a space between the third and the fourth tooth tips 90, 100 (labeled in FIG. 2). The first and second slot openings 123, 125 have a first and a second width 124, 126, respectively. In one embodiment, the first width 124 is different from the second width 126. In another embodiment, the first width 124 is the same as the second width 126. The slot opening widths of each of the plurality of slots 22 in the whole rotor 12 may be varied independently of one another.

Referring to FIG. 1, the first slot opening 123 defines a first slot opening central axis 127, midway between the first and second tooth tips 40, 50 (labeled in FIG. 2). Referring to FIG. 1, the second slot opening 125 defines a second slot opening central axis 129, midway between the third and fourth tooth tips 90, 100 (labeled in FIG. 2). Referring to FIG. 1, the first slot opening central axis 127 may be aligned with the first slot central axis 42 and the second slot opening central axis 129 may be aligned with the second slot central axis 92.

The values of the first, second, third and fourth radii 68, 74, 116 and 118 and first and second widths 124, 126 of the first and second slot openings 123, 125 may be derived through an optimization process to obtain the desired level of averaging and torque ripple reduction for the rotor 12. This optimization may be performed using finite element analysis simulation tools or other modeling methods known in the art. For example, simulated torque ripple and simulated torque output may be obtained by varying the first, second, third and fourth radii 68, 74, 116 and 118 using finite element analysis simulation tools. The "optimized" first, second, third and fourth radii 68, 74, 116 and 118 and "optimized" first and second widths 124, 126 of the first and second slot openings 123, 125 may be selected based on the configuration that decreases torque ripple to the greatest extent while maintaining an acceptable torque output. By way of example only, the first, second, third and fourth radii 68, 74, 116 and 118 may be selected to be [55.0, 50.8, 52.9, 52.9] (in mm). By way of example only, the first and second widths 124, 126 of the first and second slot openings 123, 125 may be 4.0 mm and 5.8 mm, respectively. The minimum difference between the first, second, third and fourth radii 68, 74, 116 and 118 may be determined by the tolerance limit for manufacturing the rotor 12. In one example, the manufacturing tolerance limit is ±0.1 mm.

Referring to FIGS. 1-2, the rotor 12 may include a plurality of slots 20 arranged in pairs, as illustrated by the first and second slot 22, 24 in FIG. 1. The first and second slot 22, 24 may define a configuration or set of values for the first, second, third and fourth radii 68, 74, 116 and 118 and first and second widths 124, 126 of the first and second slot openings 123, 125 that is repeated for each pair of the plurality of slots 20 in the rotor 12.

Referring to FIG. 1, the dimensions of the first and second slot 22, 24 may be selected as required for each particular application. In one example, the first and second slot 22, 24 have a slot height of 16 mm and a slot width of 29.8 mm. Referring to FIG. 1, optionally, the rotor 12 may include permanent magnets (not shown) disposed at various locations within the rotor 12.

Figure 3:
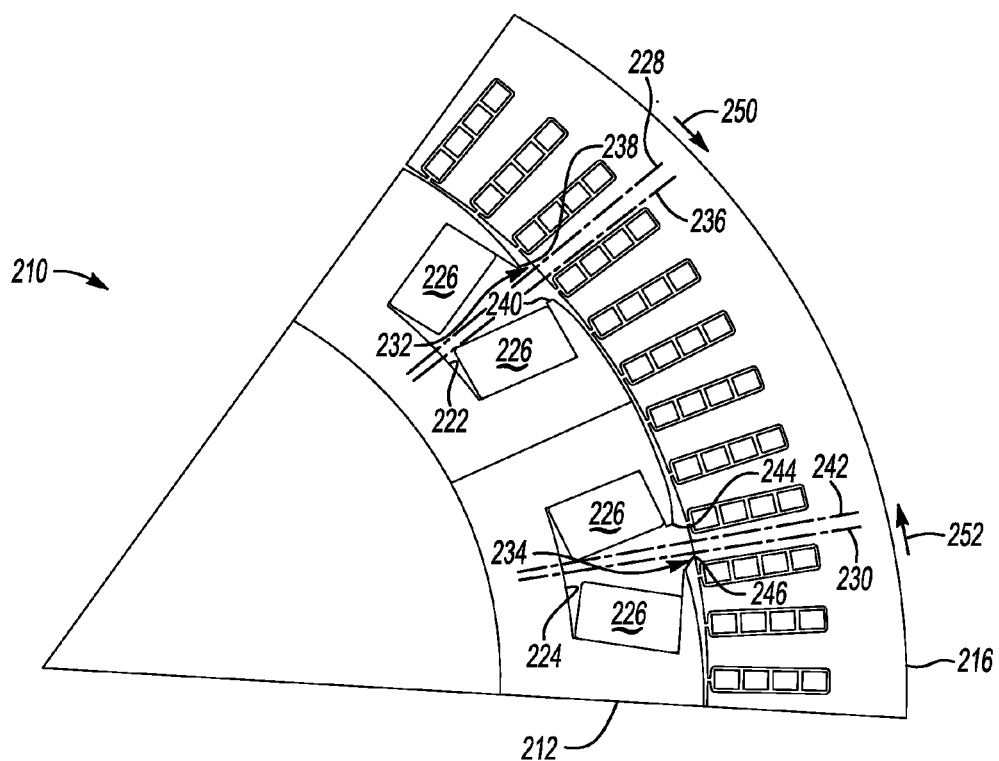
FIG. 3 is a schematic fragmentary cross-sectional view of an electric machine, in accordance with a second embodiment of the present disclosure.

FIG. 3 is a schematic fragmentary cross-sectional view of an electric machine 210, in accordance with an embodiment in which the central axes of the slots and their respective slot openings are not aligned. The electric machine 210 includes a stator 216 and a rotor 212 having a first slot 222 and a second slot 224. Rotor field windings 226 may be positioned in each of the first and second slots 222, 224. Referring to FIG. 3, the first slot 222 defines a first slot central axis 228, at the center of the first slot 222. The second slot 224 defines a second slot central axis 230, at the center of the second slot 224. The first and second slots 222, 224 define first and second slot openings 232, 234, respectively.

Referring to FIG. 3, the first slot opening 232 defines a first slot opening central axis 236, midway between a first tooth tip 238 and a second tooth tip 240. Referring to FIG. 3, the second slot opening 234 defines a second slot opening central axis 242, midway between a third tooth tip 244 and a fourth tooth tip 246. Referring to FIG. 3, the first slot opening central axis 236 is off-set in a first direction 250 from the first slot central axis 228. The second slot opening central axis 242 is off-set in a second direction 252 from the second slot central axis 230. Alternatively, first and the second slot opening central axis 236, 242 may both be offset from the first and the second slot central axis 228, 230 in the same direction.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electric machine comprising:
a rotor configured to be rotatable within a stator;
a first tooth disposed along an outer perimeter of the rotor, the first tooth defining a first outer edge extending between a first tooth base and a first tooth tip;
a second tooth disposed along the outer perimeter of the rotor, the second tooth defining a second outer edge extending between a second tooth base and a second tooth tip;
a first slot provided in the rotor and at least partially defined by the first and the second tooth;
wherein an arc radius from an origin to the outer perimeter of the rotor varies along the first outer edge, thereby creating a first non-uniform gap between the rotor and the stator;
wherein the arc radius from the origin to the outer perimeter of the rotor varies along the second outer edge, thereby creating a second non-uniform gap between the rotor and the stator;
a first slot central axis defined by the first slot; and
a first slot opening defined by a space between the first and the second tooth tip and having a first slot opening central axis, the first slot opening central axis being offset from the first slot central axis.

2. The machine of claim 1, in combination with a stator having a hollow core such that the rotor is positioned inside the hollow core of the stator.

3. An electric machine comprising:
a rotor configured to be rotatable within a stator;
a first tooth disposed along an outer perimeter of the rotor, the first tooth defining a first outer edge extending between a first tooth base and a first tooth tip;
a second tooth disposed along the outer perimeter of the rotor, the second tooth defining a second outer edge extending between a second tooth base and a second tooth tip;
a first slot provided in the rotor and at least partially defined by the first and the second tooth;
wherein an arc radius from an origin to the outer perimeter of the rotor varies along the first outer edge, thereby creating a first non-uniform gap between the rotor and the stator;
wherein the arc radius from the origin to the outer perimeter of the rotor varies along the second outer edge, thereby creating a second non-uniform gap between the rotor and the stator; and
the first outer edge is defined by an arc of a first circle centered on a straight line between the first tooth base and the origin of the rotor, the first circle defining a first radius.

4. The machine of claim 3, wherein the second outer edge is defined by an arc of a second circle having a second center centered on a straight line between the second tooth base and the origin of the rotor, the second circle defining a second radius.

5. The machine of claim 4, wherein the first radius is different from the second radius.

6. The machine of claim 4, wherein the first radius is approximately 55.0 mm and the second radius is approximately 50.8 mm.

7. An electric machine comprising:
a rotor configured to be rotatable within a stator;
a first tooth disposed along an outer perimeter of the rotor, the first tooth defining a first outer edge extending between a first tooth base and a first tooth tip;
a second tooth disposed along the outer perimeter of the rotor, the second tooth defining a second outer edge extending between a second tooth base and a second tooth tip;
a first slot provided in the rotor and at least partially defined by the first and the second tooth;
wherein an arc radius from an origin to the outer perimeter of the rotor varies along the first outer edge, thereby creating a first non-uniform gap between the rotor and the stator;
wherein the arc radius from the origin to the outer perimeter of the rotor varies along the second outer edge, thereby creating a second non-uniform gap between the rotor and the stator;
a third and a fourth tooth disposed along an outer perimeter of the rotor and at least partially defining a second slot in the rotor, the third and the fourth tooth each defining a respective third and fourth outer edge;
wherein the arc radius from the origin to the outer perimeter of the rotor varies along the third outer edge, thereby creating a third non-uniform gap between the rotor and the stator; and
wherein the arc radius from the origin to the outer perimeter of the rotor varies along the fourth outer edge, thereby creating a fourth non-uniform gap between the rotor and the stator.

8. The machine of claim 7, further comprising:
a first slot opening defined by a space between the first and the second tooth tip and having a first width; and
a second slot opening defined by a space between the third and the fourth tooth tip and having a second width, the first width being different from the second width.

9. The machine of claim 7, wherein the first width is approximately 4.0 mm and the second width is approximately 5.8 mm.

10. The machine of claim 7, further comprising:
a first slot opening defined by a space between the first and the second tooth tip and having a first slot opening central axis;
a second slot opening defined by a space between the third and the fourth tooth tip and having a second slot opening central axis; and
wherein the first slot opening central axis is offset from the first slot central axis in a first direction and the second slot opening central axis is offset from the second slot central axis in a second direction.

11. The machine of claim 7, wherein the first, second, third and fourth outer edges are each defined by an arc of a first, second, third and fourth circle, respectively, centered on a straight line between the origin of the rotor and the first, second, third and fourth circle tooth base, respectively, and defining a first, second, third and fourth radius, respectively.

12. The machine of claim 11, wherein the first radius is different from the second radius and the third radius is the same as the fourth radius.

13. The machine of claim 1, wherein the first radius is approximately 55.0 mm, the second radius is approximately 50.8 mm and the third and the fourth radius are approximately 52.9 mm.

14. The machine of claim 11, wherein the first, second, third and fourth radius are each different from one another.

* * * * *